Patented Oct. 2, 1923.

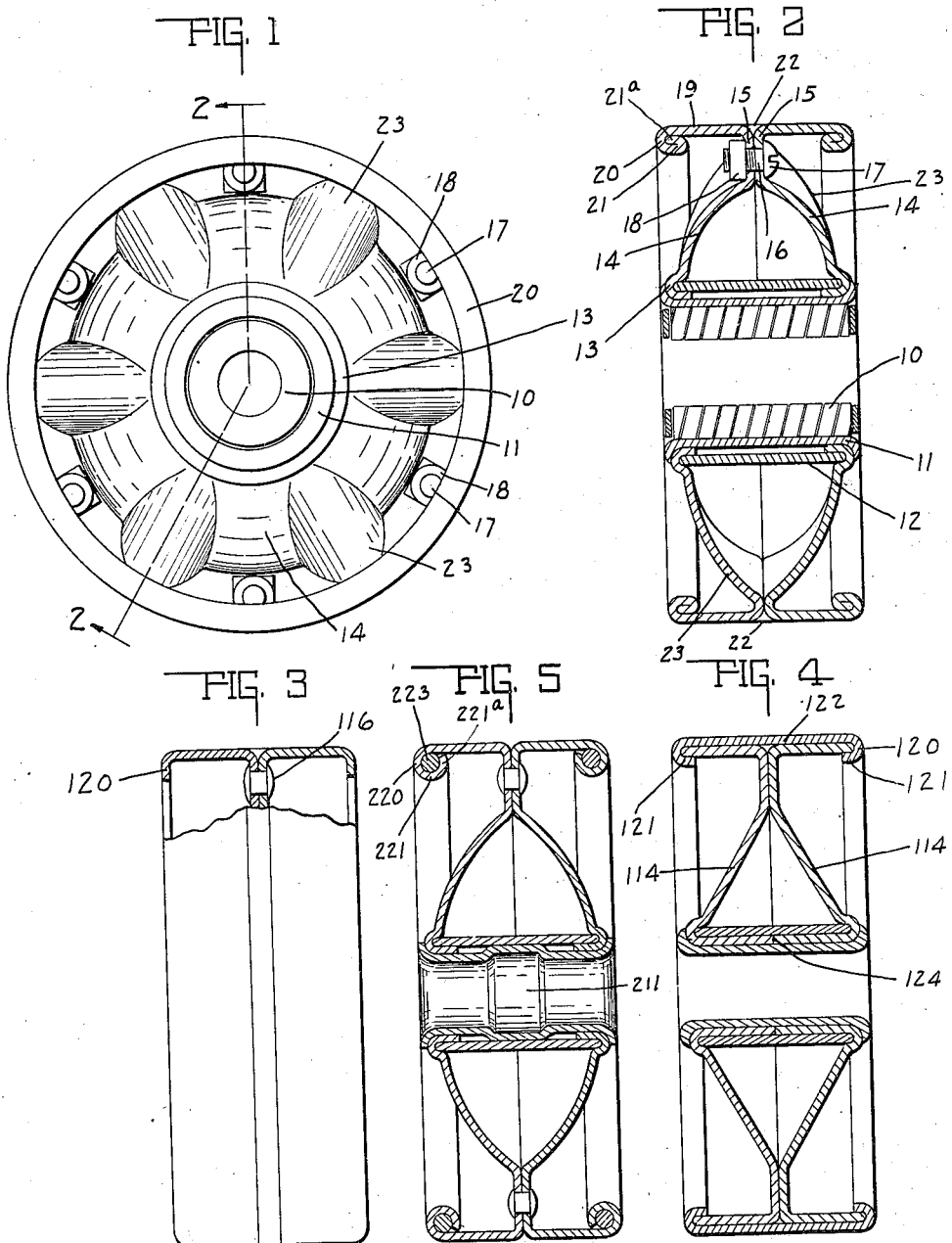

1,469,397

UNITED STATES PATENT OFFICE.

EMIL A. SMITHFIELD AND WILLIAM H. NOELTING, OF EVANSVILLE, INDIANA, ASSIGNORS TO FAULTLESS CASTER COMPANY, OF EVANSVILLE, INDIANA, A CORPORATION.

TRUCK CASTER WHEEL.

Application filed February 17, 1922. Serial No. 537,330.

*To all whom it may concern:*

Be it known that we, EMIL A. SMITHFIELD and WILLIAM H. NOELTING, citizens of the United States, and residents of Evansville, county of Vanderburg, and State of Indiana, have invented a certain new and useful Truck Caster Wheel; and we do hereby declare that the following is a full, clear, and exact description thereof, reference being had to the accompanying drawings, in which like numerals refer to like parts.

This invention relates to a wheel and one which is primarily adapted to form a caster wheel for trucks and the like, wherein a smooth and true wheel periphery is desired, together with great strength in the wheel structure.

One feature of the invention, in addition to the accomplishment of the foregoing objects, is the construction of a caster wheel from a pair of identical plates which are suitably secured together to form said wheel in a manner to insure the greatest strength.

Another feature of the invention consists in the plural bushing locking arrangement of the plates forming the wheel.

Still a further feature of the invention consists in the annular member associated with the two plates to form a smooth periphery in the completed wheel.

Still a further feature of the invention consists in the construction of the plates whereby the same are ribbed for strengthening purposes.

The full nature of this invention will be understood from the accompanying drawings and the following description and claims.

In the drawings Fig. 1 is a side elevational view of one form of wheel embodying the invention. Fig. 2 is a sectional view of the same taken on line 2—2 of Fig. 1 and in the direction of the arrows. Fig. 3 is an end view of another form of the invention with a portion broken away to show other parts in section. Fig. 4 is a central sectional view of another form of the invention. Fig. 5 is an end view of another form of the invention with a portion broken away to show other parts in section.

In the drawings, 10 indicates a roller bearing construction which may be of any desired type. Said roller bearing construction is receivable by a concentric locking bushing 11. The concentric bushing 11 may be of any desired diameter and may or may not, as shown in Figs. 2 and 4, receive said roller bearing and be supported upon a shaft or spindle. Concentric with said sleeve 11 is another spacing or bushing sleeve 12 and associated with said sleeve is a pair of identical cup-shaped plates, each of which is provided with a central opening surrounded by an annular groove forming flange 13. The annular flange 13 receives the spacing bushing 12 and is secured in position by means of the locking bushing 11 having the ends thereof expanded, as shown in Figs. 2 and 4, to retain the bushings and the plates in assembled relation. Each of the plates extends inwardly and angularly and in Fig. 2 said angular portion 14 is curved and the pair of plates, when in assembled relation, form an arch construction. Each of the bowl-shaped angular portions is provided with a radial flange 15 which is perpendicular to the axis of the wheel and the axis of the opening surrounded by the angular groove 13. The flanges 15 of both wheel forming plates are abuttable and in the present instance are shown apertured as at 16 and secured together by bolt and nut means 17 and 18 respectively, the former being seatable in the registering apertures 16. Each of the flanges 15 is provided with a circumferential flanges 19 which is concentric with the sleeves 11 and 12 and the wheel axis. The other edge of the circumferential flange 19 extends parallel to the flange 15, as at 20, and as shown in Fig. 3, said flanges may terminate at 120. In the modification shown in Fig. 2 the flange 20, however, is turned inwardly at 21 and back upon itself at 21ª to form a bead for reenforcing purposes.

In order to form a smooth periphery an annular member is provided which herein is indicated by the numeral 22 and in Fig. 2 said annular member comprises a triangular sectioned bearing ring which is soldered or otherwise secured to the two wheel forming plates in order to form a smooth periphery for the wheel. In order to provide additional strength each of the plates is ribbed as at 23 and said ribbed constructions 23, in the present invention, also are arch shaped in cross section.

In Fig. 3 the modification disclosed does not include the bead edge 21, but includes only the flange 120 similar to the flange 20, shown in Fig. 2. Likewise the two wheel forming plates are shown secured together by a rivet 116 instead of by the bolt and nut means shown in Fig. 2. It is likewise to be understood that said plates may be otherwise secured together without departing from the broader features of the invention, and one of said means, not shown herein, is by spot welding the same at suitable points along the abutting flange portions 15.

In Fig. 4 another modified form of the invention is illustrated and in this form instead of an arch shaped portion 14, a triangular shaped portion 114 is shown and instead of providing the triangular sectioned annular member for forming a smooth periphery there is provided an annular sleeve member 122 which extends substantially across the peripheral flange portions of the wheel forming plates and is turned over the same, as at 121 to lock the plates together at the abutting peripheral edge. The plates are locked together at the hub portion of the wheel by the usual pair of concentric bushings. Herein it will be noted that the ends of the plates are extended inwardly into abuttable relation at 124. In the form of the invention shown in Fig. 4 no other means such as rivets are necessary to secure the plates together, and if desired the spacing bushing may likewise be omitted.

In Fig. 5 a modified form of the invention is illustrated and in this form the inner or locking bushing is offset at 211. Likewise the radial flanged edge 220 is curled at 222 and 221ᵃ to secure a reenforcing ring 223. If desired the triangle annular member 22 may be positioned at the junction of the plates.

The invention claimed is:

1. In a wheel, the combination of a pair of plates having rim forming flanges and central openings adapted to register, groove forming flanges concentric with the openings, a spacing sleeve having its edges seatable in said grooves, a second sleeve concentric within the first sleeve with its edges securing the plates and spacing sleeve together at the hub portion, and an annular member associated with the rim forming flanges to form a smooth wheel rim.

2. In a wheel, the combination with a pair of complementary plates having central openings adapted to register, and radial portions, and a central pair of concentric sleeves, of an annular concentric groove forming projection curved in radial cross section and projecting outwardly from each plate at the opening and defining the same, said outer sleeve being seatable in the grooves of said plates, and the inner sleeve locking the same together.

In witness whereof, we have hereunto affixed our signatures.

EMIL A. SMITHFIELD.
WILLIAM H. NOELTING.